United States Patent
Berrebi et al.

(10) Patent No.: US 12,023,896 B2
(45) Date of Patent: Jul. 2, 2024

(54) FILLED-PORE DECORATIVE LAYER FOR ION EXCHANGE AND AUTOMOTIVE GLASS

(71) Applicant: Corning Incorporated, Corning, NY (US)

(72) Inventors: Mickaël Berrebi, Paris (FR); Philippe Lehuede, Dammarie-les-Lys (FR)

(73) Assignee: CORNING INCORPORATED, Corning, NY (US)

( * ) Notice: Subject to any disclaimer, the term of this patent is extended or adjusted under 35 U.S.C. 154(b) by 327 days.

(21) Appl. No.: 17/603,719

(22) PCT Filed: Apr. 15, 2020

(86) PCT No.: PCT/US2020/028176
§ 371 (c)(1),
(2) Date: Oct. 14, 2021

(87) PCT Pub. No.: WO2020/214623
PCT Pub. Date: Oct. 22, 2020

(65) Prior Publication Data
US 2022/0194056 A1 Jun. 23, 2022

Related U.S. Application Data

(60) Provisional application No. 62/834,682, filed on Apr. 16, 2019.

(51) Int. Cl.
*B32B 15/04* (2006.01)
*B32B 17/06* (2006.01)
(Continued)

(52) U.S. Cl.
CPC ........ *B32B 17/10247* (2013.01); *B32B 17/06* (2013.01); *B32B 17/10036* (2013.01);
(Continued)

(58) Field of Classification Search
CPC ........ B32B 17/10247; C03C 2217/425; C03C 17/009
(Continued)

(56) References Cited

U.S. PATENT DOCUMENTS 5,710,081 A 1/1998 Tuenker
9,214,335 B2 * 12/2015 Bruce ............... H01L 21/31116
(Continued)

FOREIGN PATENT DOCUMENTS

CN 104203855 A 12/2014
CN 104395259 A 3/2015
(Continued)

OTHER PUBLICATIONS

Chinese Patent Application No. 202080038259.9, Office Action, dated Dec. 16, 2022, 4 pages Chinese Patent Office.
(Continued)

*Primary Examiner* — Lauren R Colgan
(74) *Attorney, Agent, or Firm* — William M. Johnson; Payal A. Patel

(57) ABSTRACT

The disclosure relates to glass articles having a decorative inorganic layer that is compatible with ion exchange processes and suitable for automotive glass. The inorganic layer comprises a plurality of pores in which polymerizable filler components have been deposited and cross-linked. The porous inorganic layer has a glass transition temperature of greater than 450° C. and a glass softening temperature of less than 650° C. The disclosure also provides glass articles containing the filled porous inorganic layer and methods for preparing the same.

16 Claims, 5 Drawing Sheets

(51) Int. Cl.
 *B32B 17/10* (2006.01)
 *C03C 17/00* (2006.01)
(52) U.S. Cl.
 CPC .... *B32B 17/10137* (2013.01); *B32B 17/1055* (2013.01); *C03C 17/009* (2013.01); *B32B 2250/03* (2013.01); *B32B 2260/046* (2013.01); *B32B 2266/04* (2013.01); *B32B 2307/308* (2013.01); *B32B 2307/4026* (2013.01); *B32B 2605/006* (2013.01); *C03C 2217/425* (2013.01); *C03C 2217/72* (2013.01)
(58) Field of Classification Search
 USPC ..................................... 428/426, 428, 432
 See application file for complete search history.

(56) References Cited

U.S. PATENT DOCUMENTS

| | | | | |
|---|---|---|---|---|
| 9,315,413 | B2* | 4/2016 | Singh | C03C 17/23 |
| 9,487,439 | B2* | 11/2016 | Axtell, III | C03C 21/002 |
| 10,308,548 | B2* | 6/2019 | Knoche | B05D 5/06 |
| 11,420,901 | B2* | 8/2022 | Menke-Berg | C03C 3/083 |
| 11,554,986 | B2* | 1/2023 | Lehuede | C03C 3/21 |
| 2002/0051043 | A1 | 5/2002 | Hsu et al. | |
| 2006/0154085 | A1* | 7/2006 | Cleary | B32B 17/10761 |
| | | | | 428/428 |
| 2007/0087183 | A1* | 4/2007 | Li | C03C 17/38 |
| | | | | 428/319.3 |
| 2009/0233082 | A1* | 9/2009 | Esemann | B44C 3/02 |
| | | | | 428/319.1 |
| 2010/0101649 | A1* | 4/2010 | Huignard | B32B 17/10036 |
| | | | | 427/373 |
| 2010/0210745 | A1* | 8/2010 | McDaniel | C09D 7/48 |
| | | | | 521/55 |
| 2012/0282407 | A1* | 11/2012 | Singh | C03C 17/04 |
| | | | | 501/19 |
| 2013/0122221 | A1* | 5/2013 | Colton | B32B 9/04 |
| | | | | 428/317.1 |
| 2014/0242375 | A1* | 8/2014 | Mauro | C03B 17/02 |
| | | | | 65/53 |
| 2014/0370304 | A1* | 12/2014 | Axtell, III | B60J 1/00 |
| | | | | 428/428 |
| 2015/0013390 | A1* | 1/2015 | Singh | C03C 3/089 |
| | | | | 65/60.5 |
| 2015/0037507 | A1* | 2/2015 | Bockmeyer | B05D 7/52 |
| | | | | 427/407.2 |
| 2016/0002104 | A1* | 1/2016 | Lehuede | C03C 8/14 |
| | | | | 65/30.14 |
| 2016/0333134 | A1* | 11/2016 | Hieber | C08G 18/4854 |
| 2018/0292577 | A1* | 10/2018 | Yabuta | C23C 18/122 |
| 2019/0241467 | A1 | 8/2019 | Knoche et al. | |
| 2019/0276354 | A1* | 9/2019 | Ducourthial | C03C 17/42 |
| 2020/0299183 | A1* | 9/2020 | Mannheim Astete | C03C 8/02 |
| 2023/0286253 | A1* | 9/2023 | Flamary-Mespoulie | |
| | | | | C03C 17/3652 |

FOREIGN PATENT DOCUMENTS

| | | | |
|---|---|---|---|
| CN | 105143128 | A | 12/2015 |
| EP | 0625422 | A1 | 11/1994 |
| EP | 0885314 | A1 | 12/1998 |
| EP | 1761475 | A1 | 3/2007 |
| JP | 09-221337 | A | 8/1997 |
| JP | 2005-029083 | A | 2/2005 |
| JP | 2005-038622 | A | 2/2005 |
| JP | 2015-520721 | A | 7/2015 |
| JP | 2016-511740 | A | 4/2016 |
| WO | 97/27149 | A1 | 7/1997 |
| WO | 97/33012 | A1 | 9/1997 |
| WO | 2006/004999 | A1 | 1/2006 |
| WO | 2013/156617 | A1 | 10/2013 |
| WO | 2014/133932 | A1 | 9/2014 |

OTHER PUBLICATIONS

Japanese Patent Application No. 2021-559638, Office Action, dated Nov. 2, 2022, 14 pages (7 pages of English Translation and 7 pages of Original Copy); Japanese Patent Office.
International Search Report and Written Opinion of the International Searching Authority; PCT/US2020/028176; dated Jul. 17, 2020; 8 pages; European Patent Office.
Wypych, "Handbook of Solvents", ChemTec Publishing, 2001, 7 pages.

* cited by examiner

FILLED-PORE DECORATIVE LAYER FOR ION EXCHANGE AND AUTOMOTIVE GLASS

CROSS-REFERENCE TO RELATED APPLICATIONS

This application is a national stage application under 35 U.S.C. § 371 of International Application No. PCT/US2020/028176, filed on Apr. 15, 2020, which claims the benefit of priority under 35 U.S.C. § 119 of U.S. Provisional Application Ser. No. 62/834,682 filed on Apr. 16, 2019 the content of which are relied upon and incorporated herein by reference in their entirety.

BACKGROUND

Frit layers are commonly used as decorative and tinting elements for automotive glass such as windshields, sunroofs and rear windows. As decorations, frit typically takes the form of dot gradients and borders along the periphery of window glass. Decorative frit layers can serve both to enhance appearance and to protect underlying adhesives from ultraviolet degradation.

Automotive glass has conventionally been formed from thermally tempered soda-lime silica glass. Thermal tempering induces surface compressive stress that strengthens the glass against mechanical failure. However, the stresses and inherent risks of the road require conventional automotive glass to be relatively thick and heavy. There is a need in the automotive glass industry for improved glass articles having increased resistance to mechanical failure and decreased thickness and weight.

Ion exchange processes can generally provide glass articles having improved strength or reduced thickness compared to conventional soda-lima glass. As such, ion exchange processes may be particularly useful in the automotive glass industry. However, commercial decorative frit layers are generally incompatible with ion exchange processes. Conventionally, no ion exchange is achieved underneath a decorative glass frit layer.

Accordingly, there is a need for an improved frit layer suitable for ion exchange processes.

SUMMARY

The disclosure provides, among other things, use of an inorganic layer that is compatible with ion exchange processes and suitable as a decorative layer for automotive glass. The inorganic layer comprises a plurality of pores in which polymerizable filler components have been deposited and cross-linked.

The disclosure further provides a glass article comprising a glass substrate; a porous inorganic layer adhered to at least a portion of the glass substrate and having a glass transition temperature of greater than 450° C., a glass softening temperature of less than 650° C. and a plurality of pores; and a cross-linked organic resin within the pores of the porous inorganic layer.

The disclosure also provides a multilayer automotive glass comprising a soda-lime glass substrate having a first major surface (S1) and a second major surface (S2); a chemically-strengthened glass substrate having a third major surface (S3) and a fourth major surface (S4); a polyvinyl butyrate layer contacting the second major surface of the soda-lime glass substrate and the third major surface of the chemically-strengthened glass substrate; and a porous inorganic layer adhered to at least a portion of the fourth major surface of the chemically-strengthened glass substrate; wherein the porous inorganic layer has a glass transition temperature of greater than 450° C., a glass softening temperature of less than 650° C. and a plurality of pores containing a cross-linked organic resin.

The disclosure yet further provides a method of preparing a glass article, comprising depositing an inorganic mixture containing ceramic enamel and pigment; curing the glass substrate and the deposited porous inorganic layer at a temperature greater than the glass softening temperature of the porous inorganic layer; chemically strengthening the cured glass substrate and the porous inorganic layer thereon via ion exchange at a temperature below the glass transition temperature (Tg) of the decorative porous inorganic layer; treating the chemically-strengthened glass substrate with a filling formulation comprising a polymerizable cross-linking component; and curing the polymerizable cross-linking component to provide a cross-linked organic resin within pores of the porous inorganic layer.

Advantages, some of which are unexpected, are achieved by embodiments of the present disclosure. For example, the method described has the advantage of depositing the decorative inorganic layer prior to ion exchange and bending processes thus permitting use of screen printing and avoiding further frit processing steps. In some embodiments, the method also has the advantage of permitting use of commercially available and conventional ceramic enamel which are conventionally incompatible with ion exchanged processes. Further, methods and products herein can provide a decorated glass having improved compatibility with sealant glues, such as silicone and urethane sealants typically used for securing automotive glass to the vehicle. For example, the present disclosure provides articles having a filled-pore decorative layer that does not suffer from diffusion of the sealant glue or its primer, thus resulting in improved appearance and easier sealing. Further, the resulting decoration has improved color depth and improved scratch resistance.

DESCRIPTION OF THE DRAWINGS

The drawings illustrate generally, by way of example, but not by way of limitation, various embodiments discussed herein.

Figure 1:
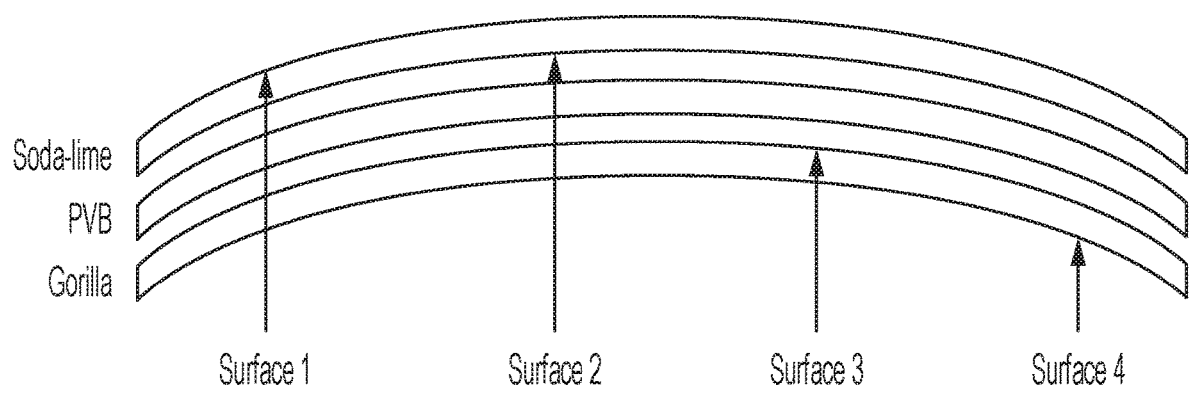
FIG. 1 provides a schematic illustration of a multilayer windshield comprising a chemically strengthened glass.

It should be understood that numerous other modifications and examples can be devised by those skilled in the art, which fall within the scope and spirit of the principles of this disclosure.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The disclosure provides, among other things, a glass article comprising a chemically-strengthened glass substrate and a decorative frit layer comprising a porous inorganic network having a plurality of pores in which a cross-linked organic resin has been deposited.

Chemically-strengthened glass substrates include glass substrates which have been treated by an ion exchange strengthening process. Chemically-strengthened glass substrates typically have a coefficient of thermal expansion (CTE) ranging between about $80 \times 10^{-7}/°$ C. to about $100 \times 10^{-7}/°$ C. The glass substrate can be an aluminosilicate glass, a borosilicate glass, an aluminoborosilicate glass, or alkali-containing forms thereof. One suitable commercial embodiment of the glass substrate is Gorilla® glass produced by Corning, Incorporated. Exemplary Gorilla® glass compositions are provided in US Publication No. 2011/0045961, which is incorporated by reference herein in its entirety. Chemically-strengthened glass can have an identifiable compressive stress layer extending through at least a portion of the glass substrate. The compressive stress layer may have a depth of greater than 30 μm. Chemically-strengthened glass can have a flexural strength value defined by ring on ring testing (ROR)>300 MPa. Chemically-strengthened glass can have a thickness between about 0.5 mm to about 5 mm, between about 1 mm to about 3 mm, less than 3 mm, less than 2 mm, from about 0.3 mm to about 4.0 mm, from about 0.5 mm to about 2 mm, or from about 0.7 mm to about 1.5 mm. The chemically-strengthened glass substrates need not be limited to any specific ion exchange process. For the sake of illustration, an example ion exchange strengthening process can be conducted at a temperature of about 390° C. to about 500° C., or about 410° C. to about 450° C. for about 1 hour to about 15 hours.

The glass articles described herein contain a porous inorganic layer having pores which are filled with an organic filler that is cross-linked to secure it within the pores of the inorganic layer. When deposited on glass, such as automotive glass, the inorganic layers can function as a decorative frit. Decorative frits can serve an aesthetic purpose, a functional purpose, or both. Typically, a decorative frit will have the dual function of offering an attractive appearance and acting as a shield to block visible and UV light.

The porous inorganic layer is compatible with the ion exchange chemical-strengthening process. To achieve this compatibility, the CTE (Coefficient of Thermal Expansion) of the porous inorganic frit layer has to approximately match the CTE of the glass substrate to avoid breakage or warpage of the products and its glass transition temperature (Tg) has to be higher than the ion exchange temperature so as not to degrade the quality of the decoration during exchange. To match the CTE of the glass substrate, the porous inorganic layer can have a CTE within $10 \times 10^{-7}/°$ C., or $5 \times 10^{-7}/°$ C., or is about the same as the CTE of the glass substrate. The porous inorganic layer, has a glass transition temperature (Tg) greater than, or about equal to 450° C., 475° C., 500° C., 525° C., 550° C., 575° C., or greater than, or about equal to 600° C. Additionally, the cured porous inorganic layer can be compatible with the temperatures required for bending, chemical strengthening, and laminating processes. In some embodiments, the uncured inorganic layer is capable of being cured before or during the heating phase of another processing step, for example, the cure step may be conducted during a portion of a heating cycle, e.g., initial heating, as part of the bending process. Thus, the cured porous inorganic layer, the uncured inorganic layer, or both, have a glass softening point (Ts) that is below the temperature of these processes, or less than 750° C. The Ts of the porous inorganic layer can be less than or about equal to 700° C., 650° C., 600° C., 570° C., 550° C., 525° C., 500° C., 475° C., or about equal to 450° C. After the porous inorganic layer is cured and the glass substrate is chemically-strengthened, the glass substrate can show a compressive stress layer extending into at a least a portion of the glass substrate. Such compressive stress layer may have a depth of greater than 30 μm.

The porous inorganic layer is deposited on at least one surface of the glass substrate. For example, the porous inorganic layer can be deposited on one or more major surface of the glass substrate. The porous inorganic layer can be deposited on just a portion of a surface, e.g., along the periphery of a major surface so as to constitute a border. The porous inorganic layer can occupy an area of the surface less than 60%, 50%, 40%, 30%, 20%, 10%, 5%, 1%, 0.1%, or less than 0.01% of the total surface area.

As used herein, the term "porous inorganic layer" can refer to a filled-pore state or an unfilled state, depending on the context of whether organic filler has been deposited in the pores. If organic filler is not deposited and crosslinked so as to at least partially fill the pores, the porous inorganic layer can be referred as a "open pore" porous inorganic layer. If the pores are at least partially filled with organic filler deposited and crosslinked therein, the porous inorganic layer can be referred as a "filled-pore" porous inorganic layer.

The present disclosure comprehends two general types of porous inorganic layers.

A first type of porous inorganic layer is a mixture of ceramic enamel and pigment. Commercially available ceramic enamels are generally incompatible with ion exchange chemical-strengthening processes and prevent ion exchange of the glass substrate underlying the porous inorganic layer. Herein, to achieve pore formation at the time of curing at least 5 wt % pigment is added to the ceramic enamel. The wt % of pigment can be determined by calculating the weight of added pigment divided by the total weight of the added pigment plus enamel. Due to such modification, the porous inorganic layer can thus be prepared from commercially available ceramic enamels, which were not previously suitable for use in an ion exchange process. The ceramic enamel can be selected from commercially available enamel for auto glazing applications.

The ceramic enamel comprises a glass frit component, a stain component, and optionally an additive component. The glass frit comprises one or more Bi, B, Zn, or Si oxides. The glass frit can be characterized by the presence of Bi, B, Zn, or Si oxides as main components. In some embodiments, the glass frit has 1 wt %, 5 wt % or 10 wt % or more of Bi, B, Zn, or Si oxide. In some embodiments, the glass frit has less than 1 mol % $Na_2O$, less than 10 mol % $Fe_2O_3$, or less than 25 mol % $P_2O_5$. In some embodiments, the glass frit is free of $Na_2O$, $Fe_2O_3$, or $P_2O_5$. The stain component is incorporated into the glass frit and comprises one or more Cu, Co, Fe, Ni, Mn, or Cr oxides. In some embodiments, the stain comprises non-Fe oxide, or is free of Fe oxides. Likewise, the porous inorganic layer resulting from such enamel will comprise a glass flux comprising oxides of Bi, B, Zn, Si, or any combination thereof. Further, the porous inorganic layer can have less than 1 mol % $Na_2O$; less than 10 mol % $Fe_2O_3$; or less than 25 mol % $P_2O_5$. In some embodiments, the porous inorganic layer can be free of $Na_2O$, $Fe_2O_3$, or $P_2O_5$.

Examples of suitable ceramic enamels are available from Ferro Corporation (Mayfield Heights, Ohio), including Product No. 14 316 (a bismuth-system based frit system, having a black, matte color, a wide firing range of 570-640° C. at 6 minutes, and relatively high melting point) and Product No. AD3402 (a black enamel which may be fired at about 620° C. for 7 minutes). The enamel can be black, white, or any color, e.g., red, indigo, blue, green, brown, orange, violet, yellow.

The porous inorganic layer can be composed of about 40 wt % to about 95 wt % ceramic enamel, about 50 wt % to about 90 wt % ceramic enamel, about 60 wt % to about 80 wt % ceramic enamel. The ceramic enamel can be about 40 wt %, 45 wt %, 50 wt %, 55 wt %, 60 wt %, 65 wt %, 70 wt %, 75 wt %, 80 wt %, 85 wt %, 90 wt % or about 95 wt % of the porous inorganic layer. The porous inorganic layer can be composed of about 5 wt % to about 60 wt % pigment, about 5 wt % to about 55 wt % pigment, or about 20 wt % to about 30 wt % pigment. In various embodiments, the ceramic enamel contains stain which is incorporated into the glass frit such that it would not be possible to mechanically sort or separate it from the glass frit. The stain can be 15 wt % to 40 wt % of the ceramic enamel. On the other hand, the added pigment can be in the form of separate particles. For example, prior to curing, sintering or deposition, the inorganic layer can, in embodiments, be a mixture of discrete pigment particles and ceramic enamel particles. Examples of suitable pigment include B1G pigment, 30C965 (a CuCr-based pigment), and 20F944 (a MgFe-based pigment) from Shepherd (Cincinnati, Ohio) and V7709 (a CuCr-based pigment) and 240137 (a FeCrCoNi-based pigment) from Ferro Corporation (Mayfield Heights, Ohio). Pigments can be black, blue, green, brown, orange, violet, yellow, or metallic variants thereof. In various embodiments, the pigments are the same or similar color as the enamel. Pigments may be selected which have the following primary-components in order to obtain desired color, for example as follows: black (CuCrFe, CrFe, manganese ferrite spinel, FeCrCoNi), blue (Cobalt aluminate, cobalt chromite spinel, CoZnCrAl), green (Cobalt titanate green spinel), brown (Manganese antimony titanium buff rutile, zinc iron chromite brown spinel, iron titanium brown spinel), orange (Rutile tin zinc), violet (Cobalt phosphate), yellow (Nickel antimony titanium yellow rutile, niobium sulfur tin zinc oxide), and metallic aspect (Mica flakes covered with titanate, titanate and tin oxide, or iron oxide). In various embodiments, the glass article is a windshield and the pigment is black. In some embodiments, the glass article is intended for automobile interiors and the pigment is blue, green, brown, orange, violet, yellow or metallic versions thereof.

The second type of porous inorganic layer comprises a glass frit containing $Na_2O$, $Fe_2O_3$, or $P_2O_5$. The glass frit can be optionally mixed with inorganic pigments and an organic binder, such as pine oil or amyl acetate nitrocellulose. Porous inorganic layer according to this second type having $Na_2O$, $Fe_2O_3$, or $P_2O_5$ tend to crystallize after curing and this crystallization can influence porosity. In some embodiments, the second type of porous inorganic layer is a crystallizing porous inorganic layer. The porous inorganic layer according to the second type can have from about 0 to about 10 mol % $Al_2O_3$; from about 0 to about 10 mol % CoO; from about 5 to about 25 mol % $Na_2O$; from about 0 to about 15 mol % 1(20; from about 0 to about 10 mol % $V_2O_5$; from about 0 to about 8 mol % $TiO_2$; from about 0 to about 15 mol % ZnO; from about 0 to about 10 mol % CaO; from about 20 to about 40 mol % $Fe_2O_3$; and at least about 50 mol % $P_2O_5$. Further, the second type of porous inorganic layer can have from about 8 to about 25 mol % $R_2O$, wherein $R_2O$ is $Na_2O$, $K_2O$, or both; it can have from about 50 to about 60 mol % $P_2O_5$; it can have a ratio by mol % of $Na_2O/Fe_2O_3$ or that is from about 0.2 to about 1; or a combination thereof. In various embodiments, the second type of porous inorganic layer can be silica free. The second type of porous inorganic layer includes a modified form of the porous inorganic layer described in WO 2014/133932 A1, which is incorporated by reference herewith in its entirety, and which described a porous inorganic layer having open pores. Prior inorganic layer was a porous material comprising $Na_2O$, $Fe_2O_3$, and $P_2O_5$ and was suitable for ion exchange strengthening, but has now been found to suffer from a problem with sealant glue, e.g., silicone or urethane sealants, which is commonly used to secure automotive glass to a vehicle frame. In contrast, the porous inorganic layer described in various embodiments herein is modified to have at least partially filled pores and unexpectedly results in advantages regarding color depth, scratch resistance, and compatibility with silicone and urethane sealants.

For both types of porous inorganic layer, the level of porosity is influenced by frit composition, particle size, amount of added pigment, and the firing temperature. A greater amount of pigment or lower firing temperature will result in increased porosity and better performance during ion exchange processing. However, increasing the level of porosity will degrade the cohesion of the layer, reducing scratch resistance and depth of color. At the same time, decreasing the level of porosity will result in degraded ion exchange, and induce inacceptable warping during lamination or result in sheets which are vulnerable to fracture. Thus, the porous inorganic layer should have a level of porosity suitable for the ion exchange used to chemically-strengthen the glass. Porosity can be measured, for example, by use of a scanning electron microscope (SEM) and comparing the proportion of surface occupied by pores to the total surface. In various embodiments, the porous inorganic layer can have a porosity of at least or about 5%, 10%, 15%, 20%, 40%, 50%, 60%, or greater. Further, the glass articles herewith can be used for automotive glass, which is typically affixed to vehicles by use of polyurethane-based or silicone-based sealant glues and primers. However, both types of porous inorganic layer, if left in open pore form, will suffer from strong diffusion of sealant glue and sealant primer thus strongly degrading the cosmetic aspects of the final product, reducing tack properties and leading to bad adhesion of the glass to an automotive frame.

The glass article can further be in the form of a curved glass article. For example, the glass substrate can be a curved sheet having a concave surface and a convex surface. The porous inorganic layer can be adhered to the concave surface, the convex surface, or both. In some embodiments, the glass article comprises a filled-pore inorganic layer on the concave surface and an open pore inorganic layer on the convex surface. In further embodiments, the glass article comprises a filled-pore inorganic layer on both the concave surface and the convex surface. In some embodiments, the glass article may further comprise a sealant glue contacting at least a portion of the porous inorganic layer, the concave surface of the glass substrate, or both. In yet further embodiments, the glass article may further comprise a polyvinyl butyral laminate layer, or precursors thereof, contacting at least a portion of the porous inorganic layer, the convex surface of the glass substrate, or both.

The cross-linked organic resin can have the formula:

$$[A]_x[B]_y[C]_z$$

wherein A represents a polyvalent monomer residue having three or more linking groups; B represents a divalent monomer residue having two linking groups, and C represents a terminal monomer group. The sum of x, y and z is equal to 1; x is a number between 0.05 and 1; and y is a number between 0 and 1. The value of x represents the extent of crosslinking in the organic resin and y represents the amount of linear polymer chains. For example, A can represent a crosslinked polysilsesquioxane residue, B can represent a divalent linear polyacrylate chain and C can represent a terminal methyl or hydroxyl group. The degree of cross-linking, i.e., x value, should be 0.05 or greater. In various embodiments, x is 0.05 to 0.7, x is 0.1 to 0.5, x is 0.1 to 0.3, or x is 0.05 to 0.2. For example, the cross-linked organic resin can comprise at least or about 5 mol %, 10 mol %, 15 mol %, or at least about 20 mol % cross-linked monomer units. In further embodiments, the cross-linked organic resin can comprise at least or about 5 wt %, 10 wt %, 15 wt %, or at least about 20 wt % cross-linked monomer units.

The cross-linked organic resin comprises one or more polysiloxane, polysilsesquioxane, polyacrylate, polystyrene, polyurethane, or polyamide. In various embodiments, the cross-linked organic resin comprises a silicone-containing polymer, such as a polysiloxane or polysilsesquioxane. In further embodiments, the cross-linked organic resin can comprise a carbon-based polymer such as a polyacrylate, polystyrene, polycarbonate, polyurethane, or polyamide. In some embodiments, the cross-linked organic resin contains both a silicone polymer and a polyacrylate, polystyrene, polycarbonate, polyurethane, or polyamide. For example, the cross-linked organic resin can be a cross-linked methyl-silsesquioxane, methyl-phenyl silsesquioxane, or a combination of both. In various further examples, the cross-linked organic resin can comprise an allyl-substituted polysiloxane, allyl-substituted polysilsesquioxane, allyl-substituted polyacrylate, allyl-substituted polyvinyl, allyl-substituted polystyrene, allyl-substituted polycarbonate, allyl-substituted polyurethane, or allyl-substituted polyamide. As used herein, the term "organic" thus can include silicone-containing compounds, silicone-free organic compounds, or both, unless otherwise specified.

In various embodiments, the cross-linked organic resin and the porous inorganic layer have similar refractive index values, for example values differing by 0.1 or less, or 0.01 or less, which results in enhanced depth of color of the inorganic layer.

After cross-linking, the organic resin becomes sufficiently immobilized in the pores of the porous inorganic layer so that it is not removed during cleaning of the inorganic layer and glass surface using wipes and cleaning solvents, such as ethanol and acetone. Likewise, the immobilized resin will not interact with sealant glue, sealant primer, polyvinyl butyral laminate, or the precursors thereof. Similarly, the cross-linked organic resin also has a glass transition temperature sufficient to be compatible with lamination and other glass processing steps without degrading or evaporating. For example, the glass transition temperature is greater than or about 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., or greater than or about 120° C. Filled porosity can be measured, for example, by use of a scanning electron microscope (SEM) and comparing the proportion of surface occupied by filled pores to the total number of pores. In various embodiments, the porous inorganic layer can have a filled porosity of at least or about 5%, 10%, 15%, 20%, 40%, 50%, 60%, 70%, 80%, 90%, or greater. Alternatively, the extent of filled porosity can be measured using SEM to quantify and by comparing the proportion of surface occupied by open pores to the total surface. In various embodiments, after depositing and crosslinking the resin, the porous inorganic layer can have an open porosity of less than 95%, 90%, 85%, 80%, 75%, 70%, 60%, 50%, or less than 40 wt %.

The cross-linking organic resin can be prepared by applying a filler formulation onto the porous inorganic layer and then subsequently polymerizing it via sol-gel reaction or free radical reaction, by thermal initiation or addition of a UV initiator. The filler formulation can be applied by spraying, brushing, rolling or screen-printing it onto the porous inorganic layer. In one or more embodiments, the filler formulation may include an organic solvent and organic filler components. The organic filler components can include silicone-based components and non-silicone-based components, which can each be polymerizable, cross-linkable, or both. For example, the organic filler can include a methyl-silsesquioxane, methyl-phenyl silsesquioxane, or both. Suitable organic fillers include Wacker Silres H44 (a polysilsesquioxane having phenyl and methyl group) and Wacker Silres MK (a polysilsesquioxane having methyl group only) from Wacker Chemie AG (Munich, Germany).

As another example, the organic filler can include hydroxyl-terminated silicone, methoxy-terminated silicone, or a silicone terminated with a polymerizable group such as a styrene, vinyl, allyl or acrylate containing group. The organic filler can also include a cross-linking agent, divalent linear polymers, or a mixture thereof. In some embodiments, the organic filler, prior to curing, has a glass transition temperature of 40° C. to 60° C.

In various embodiments, the organic solvent has a moderate rate of solvent evaporation corresponding to 0.8 to 3 using butyl acetate as a reference according to the *Handbook of Solvents,* 2001, G. Wypych, ChemTec Publishing, p. 48-50. For example, the organic solvent can be ethanol (1.7), isobutyl acetate (1.4), n-propyl acetate (2.3) or other solvents having similar evaporating rates and compatible with the organic filler. A further example of a suitable organic solvent is pentyl propionate. The concentration of the organic filler can be 10 wt % to 100 wt % of the solution, for example, 50 wt %. In various embodiments, the organic filler should be included below, or close to, the limit of solubility in the chosen solvent. For example, when below but close to the solubility limit, the organic fillers can start to precipitate or concentrate soon after infiltrating the pores of the inorganic layer, thus preventing the resin from removing during a subsequent cleaning step. Without being limited to theory, it is thought that such conditions help to immobilize the resin due to precipitation or high capillary forces generated within the pores. In a further embodiment, the organic fillers start to precipitate after infiltrating the pores due to evaporation of the solvent in which the filler is dissolved. In various further embodiments, the organic filler has a low viscosity and can be used without solvents. Examples of an organic filler having low viscosity are low molecular weight silsesquioxanes such as Dowsil 2405 and Dowsil 2403 from Dow Corning (Midland, MI).

Crosslinking is performed after depositing the resin and, in various embodiments, after cleaning residual resin and filler material from the surface. In various embodiments, crosslinking is initiated by heating the porous inorganic layer and deposited resin to a temperature of about 80° C. to about 250° C., about 100° C. to about 220° C., about 120°

C. to about 180° C., about 100° C. to about 150° C., about 220° C., about 180° C., about 150° C., or about 100° C. In some embodiments, the crosslinking step does not exceed the temperature at which the organic filler starts to decompose. As an example, the organic filler can contain a silicone resin containing hydroxy, ethoxy or methoxy groups, and is crosslinked at a temperature of about 150° C. for 30 minutes. Heating the article for crosslinking can have the further benefit of removing residual solvents from the surface of the inorganic layer and glass. However, solvents which evaporate too slowly, e.g., ethylene glycol monobutyl ether acetate (evaporation rate of 0.03 and boiling point of 192° C.), can result in degradation of filler material before evaporation is complete.

In various further embodiments, the organic solvent has a boiling point of greater than or about 70° C., 80° C., 90° C., 100° C., 110° C., 120° C., 130° C., 140° C., 150° C., 160° C., 170° C., or 180° C. Further, the organic solvent can have boiling point of less than 120° C., 130° C., 140° C., 150° C., 160° C., 170° C., 180° C. or 190° C. In some embodiments, the organic solvent is readily removed after deposition of the filler formulation on the porous inorganic surface. For example, in some embodiments, the solvent can be removed upon wiping the inorganic surface once or twice with a dry cloth or squeegee, and subsequent evaporation over a course of 1 minute.

In one or more embodiments, the organic solvent readily dissolves the filler components. In an alternative embodiment, the filler is an aqueous solution comprising water, but in such embodiment the crosslinking filler is an aqueous-soluble polymerizable component.

The filler formulation has a low viscosity, for example, less than 200 mPa·s, less than 100 mPa·s, or less than 50 mPa·s. A low viscosity can facilitate transport of the organic filler into the pores of the inorganic layer via capillary effect.

The disclosure also provides a multilayer automotive glass, comprising a first (outer) glass sheet, a second (inner) glass sheet, and a polyvinyl butyral laminate layer. One or more of the glass sheets may be a chemically-strengthened glass sheet. The polyvinyl butyral layer is positioned between the two glass sheets. For example, the first (outer) sheet provides the exterior surface (S1) and the outermost laminate-contacting surface (S2), while the second (inner) sheet is a chemically-strengthened sheet that provides the innermost laminate-contacting surface (S3) and the interior surface (S4). A schematic illustration is provided at FIG. 1. In various embodiments, the second glass sheet is a chemically-strengthened glass sheet, while the first glass can be soda-lime glass sheet or a chemically-strengthened glass sheet.

In various embodiments, the multilayer automotive glass includes a porous inorganic layer, which is deposited upon the interior surface (S4) of the second (inner) glass sheet (e.g., a chemically-strengthened glass sheet), the laminate-contacting surface (S3) of the second (inner) glass sheet, the laminate-contacting surface (S2) of the first (outer) glass sheet, or any combination thereof. The porous inorganic layer has a glass transition temperature of greater than 450° C., a glass softening temperature of less than 650° C. and a plurality of pores containing the cross-linked organic resin.

The multilayer automotive glass can be curved. For example, the first (outer) sheet (e.g., a soda-lime glass sheet) and the second (inner) glass sheet (e.g., a chemically-strengthened glass sheet) can each be curved along an axis so as to result in each having a concave major surface and convex major surface. Typically, the concave major surface of the chemically-strengthened glass sheet provides an interior (S4) surface, and the convex major surface of the first (outer) glass provides an exterior (S1) surface.

In various embodiments, the polyvinyl butyral laminate layer is in contact with at least a portion of the porous inorganic layer, a portion of the surface of the second (inner) glass sheet, or both. In such examples, the porous inorganic layer is adhered to at least a portion of the laminate-side surface of the second (inner) glass sheet. The multilayer automotive glass can further include a sealant glue contacting at least a portion of the porous inorganic layer, a portion of the interior surface of the second (inner) glass sheet, or both.

In various embodiments, the polyvinyl butyral laminate layer is in contact with at least a portion of the porous inorganic layer, a portion of the surface of a chemically-strengthened glass sheet, or a combination thereof. In such examples, the porous inorganic layer is adhered to at least a portion of the laminate-side surface of the chemically-strengthened glass sheet. The multilayer automotive glass can further include a sealant glue contacting at least a portion of the porous inorganic layer, a portion of a surface of the chemically-strengthened glass sheet, or a combination thereof.

In further embodiments, the multilayer automotive glass includes a filled porous inorganic layer containing a ceramic enamel and a pigment. For example, the porous inorganic layer can comprise oxides of Bi, B, Zn, Si, or any combination thereof. As a further example, the porous inorganic layer can be less than 1 mol % $Na_2O$, less than 10 mol % $Fe_2O_3$, or less than 25 mol % $P_2O_5$. That is, the porous inorganic layer can, in some embodiments, correspond to the above-described first type of porous inorganic layer. In other examples, the porous inorganic layer corresponds to the above-described second type of porous inorganic layer. In each case, the pores of the porous inorganic layer are at least partially filled with a cross-linked organic resin. The cross-linked organic resin comprises one or more polysiloxane, polysilsesquioxane, polyacrylate, polyvinyl, polystyrene, polycarbonate, polyurethane, or polyamide. In various embodiments, the cross-linked organic resin can comprise an allyl-substituted polysiloxane, allyl-substituted polysilsesquioxane, allyl-substituted polyacrylate, allyl-substituted polyvinyl, allyl-substituted polystyrene, allyl-substituted polycarbonate, allyl-substituted polyurethane, or allyl-substituted polyamide.

Conventional automotive glass products are commonly made of two laminated air-cooled strengthened glass sheets, typically 3 mm sheets of soda-lime glass, resulting in a total thickness of around 7 mm. The automotive glass described herein can comprise a sheet of chemically-strengthened glass, thus offering an improved strength to thickness ratio.

The disclosure provides, among other things, a method of preparing a glass article having a filled-pore decorative layer. An inorganic mixture containing ceramic enamel and pigment is deposited onto a glass substrate to provide a deposited inorganic layer. The resulting inorganic layer is cured, or sintered, at a temperature greater than the glass softening temperature (Ts) of the deposited material so as to form a porous inorganic layer from the ceramic enamel and pigment. The glass substrate and porous inorganic layer are then chemically strengthened via ion exchange at a temperature below the glass transition temperature (Tg) of the porous inorganic layer. After ion exchange, the pores of the porous inorganic layer are filled with a polymerizable material. In one or more embodiments, a filler formulation is prepared from an organic solvent and a polymerizable cross-linking component. The filler formulation is applied, e.g., by spraying, onto the porous inorganic layer, and is absorbed into the pores. In various embodiments, any excess filler is removed from the surface via wipes and cleaner. The resulting material is then cured to initiate cross-linking within the pores, for example, by elevating temperature or UV light treatment depending on the nature of the polymerizable filler material.

In various embodiments, the method involves cleaning the surface of the filler-treated porous inorganic layer, after applying the polymerizable cross-linking component but before initiating cross-linking. For example, the cleaning can comprise: (a) wiping the surface of the inorganic layer and glass surface with a dry cloth, tissue or wipe; (b) permitting solvent to at least partially, or completely, evaporate from the surface of the inorganic layer (e.g., by waiting 1 minute); and (c) treating the surface of the inorganic layer and glass surface with a cleaning solvent, which is subsequently removed by rinsing, evaporation, or heating. In one or more embodiments, the cleaning step can include the use of alcohol-based cleaners (such as those including an ethanol, isopropanol, acetone, ethanol, mixtures of such alcohols, and combinations and/or mixtures of such alcohols with water, or glass cleaner.

When the glass article has a chemically-strengthened glass substrate having two major surfaces (e.g., S3 and S4) and the porous inorganic layer is to be formed on both surfaces, the method involves curing one inorganic layer on one surface before curing the other. For example, one layer can be cured while the glass substrate is flat and then the second layer can be cured at the same time as bending the glass. This order of steps has the advantage of permitting a manufacturing process which avoids an uncured porous layer contacting a roller surface or contacting the mold used for glass bending. If only one surface will have a porous inorganic layer, then the precursor inorganic layer can be cured at the same time as bending, thus reducing the number of steps and economizing heat treatments.

The various embodiments of this method offer advantages in the context of the two general approaches to obtaining a decorative layer on chemically-strengthened glass. For example, the first approach involves using an ink which can be deposited onto bended sheets, i.e., after ion exchange and bending processes are complete. However, such inks are generally organic or organic hybrid inks. The second approach involves depositing an ink or decorative layer on to flat sheets, i.e., before ion exchange and bending processes are performed. A major advantage of this second approach is the possibility of using screen printing, which requires a flat surface and is incompatible with a curved or bended surface. Conventionally, the second approach has failed because commercially available enamels are incompatible with the subsequent ion exchange and bending processes.

Here, the filled-pore inorganic layer of the various embodiments herein offers a formulation in that it is compatible with ion exchange and bending processes and so can be applied to glass prior to bending, e.g., using screen printing. The present disclosure, by way of various embodiments, also provides a resulting decorative layer that has improved depth of color, improved scratch resistance, and compatibility with silicone and urethane sealants glues and primers. Compatibility with silicone and urethane sealant glues and primers represents a significant advantage of said embodiment, since sealant glues are commonly used to affix automotive glass to vehicle frames. In various embodiments, the method herein also has the advantage of being compatible with the glass forming and bending process, which can involve heating to a temperature of 570° C.-700° C., prior to or during which the curing of the inorganic layer can occur where the softening temperature (Ts) is below the process temperature, e.g., below 570° C.

Cross-linking the resin within the porous inorganic layer can also offer several unexpected advantages. Upon cross-linking, the resin can become sufficiently immobilized that the surface of the filled-pore inorganic layer and the surface of the glass substrate can be easily and quickly cleaned using a standard cleaning solvent (e.g., ethanol, acetone, isopropanol, and the like) and a minimum of wipes (e.g., one, two, three or four passes with a wipe, which may be an industrial or laboratory grade wipe). Further, the crosslinking protects the filler material during lamination steps, by providing good thermal stability and no evaporation so that the laminate result in good adhesion between the glass and PVB.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the present disclosure, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" or "approximately" as used herein can allow for a degree of variability in a value or range, for example, within 10%, within 5%, or within 1% of a stated value or of a stated limit of a range."

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

EXAMPLES

The present disclosure can be better understood by reference to the following examples which are offered by way of illustration. The present disclosure is not limited to the examples given herein.

The starting materials used in the Examples that follow can be commercially obtained from the vendors set forth in Table 1.

TABLE 1

| Product | Manufacturer | Ingredint |
|---|---|---|
| Black Enamel AD3402 | Ferro Corporation | Ceramic Enamel |
| Black Enamel No. 14316 | Ferro Corporation | Ceramic Enamel |
| Aluminosilicate glass | Corning Incorporated | Glass Substrate |
| B1G, copper chromite black spinel | Shepherd | Pigment |

Example A

Fifteen sample glass articles (Examples 1-15) were prepared according to Table 2.

TABLE 2

| Ex. # | Substrate | Enamel | Content of added pigment (% wt) | Curing | Porosity filling formulation | L* measured on "glass side" |
|---|---|---|---|---|---|---|
| 1 | Aluminosilicate | Ferro AD3402 | 25% B1G | 607° C.- 10 min | no | 24 |
| 2 | glass | | | | methyl-silsesquioxane | 15 |
| 3 | | | 25% B1G | 620° C.- 7 min | no | 20 |
| 4 | | | | | methyl-silsesquioxane | 13 |
| 5 | | | 15% B1G | | no | 17 |
| 6 | | | | | methyl-silsesquioxane | 11 |
| 7 | | Ferro 14316 | 25% B1G | 572° C.- 10 min | no | 22 |
| 8 | | | | | methyl-silsesquioxane | 15 |
| 9 | | | 15% B1G | 635° C.- 5.5 min | | 12.7 |
| 10 | | | 15% B1G | 635° C.- 5.5 min | no | 22-23 |
| 11 | | | | | methyl-silsesquioxane | 12 |
| 12 | | | | | methyl-phenyl silsesquioxane | 10.5 |
| 13 | | | 10% B1G | 635° C.- 7 min | no | 17-19 |
| 14 | | | | | methyl-silsesquioxane | 11.5 |
| 15 | | | | | methyl-phenyl silsesquioxane | 9.6 |

Figure 4:
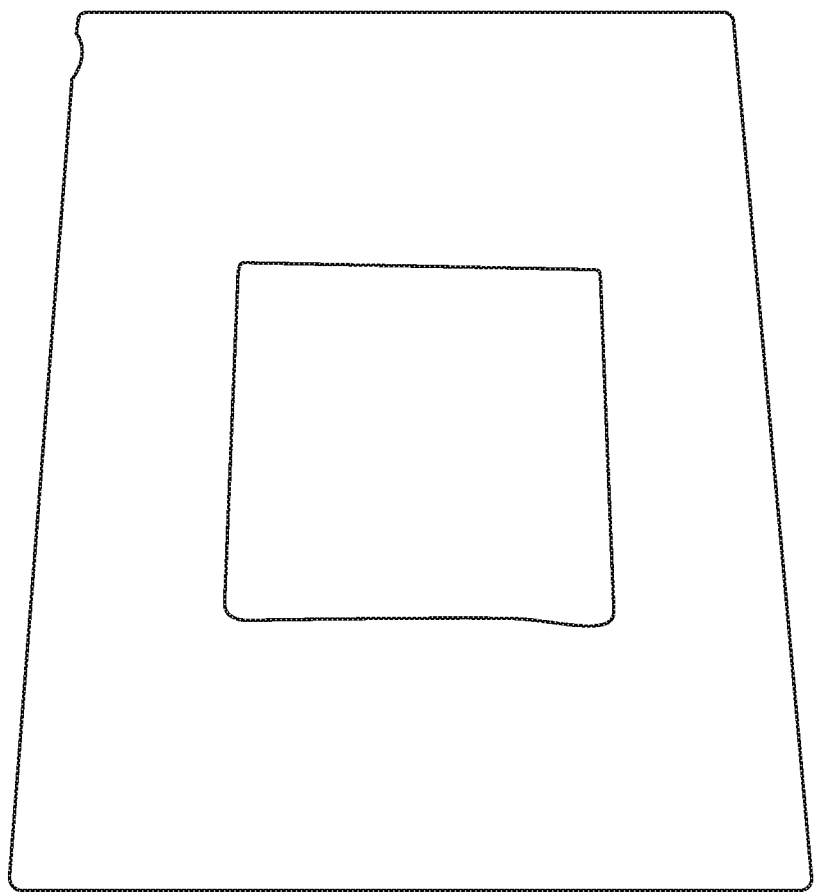
FIG. 4 provides a photograph demonstrating a sample for measuring lightness values, L*, using a colorimeter.
Figure 5:
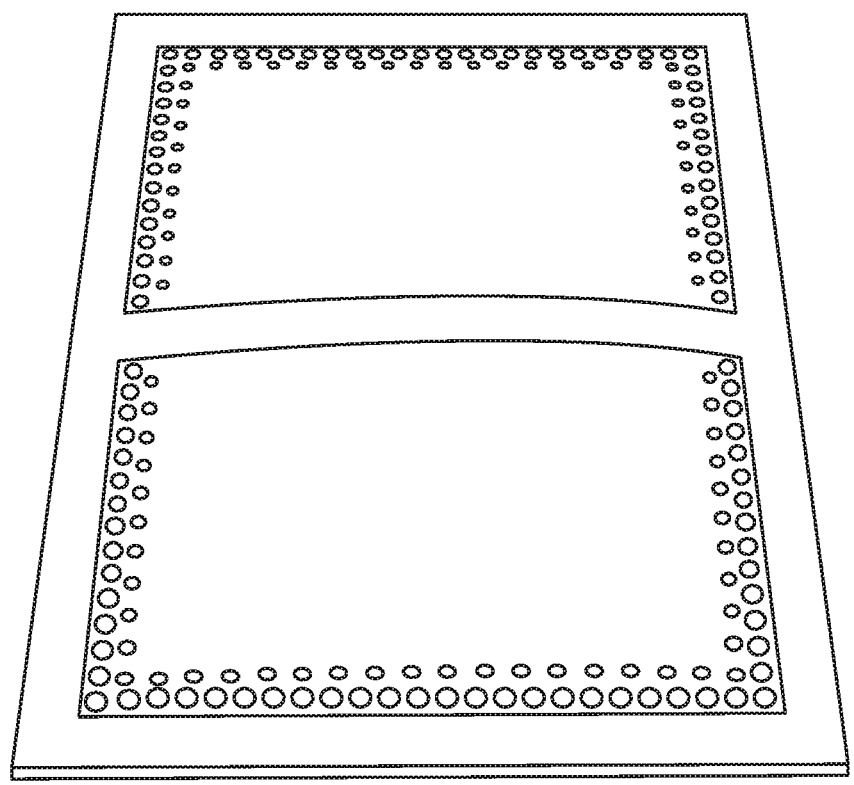
FIG. 5 provides a photograph of a multilayer glass article having a decorative design suitable for automobile windshields.

An inorganic paste was prepared by mixing black enamel AD3402 or 14316 from Ferro Corporation with copper chromite black spinel pigment (B1G) from Shephard. The paste was deposited onto the surface of an aluminosilicate glass substrate obtained from Corning Incorporated. The glass substrates had dimensions of 200 mm, 260 mm and 0.7 mm and paste was applied on a center square surface portion of the substrate having dimensions of 100 mm and 100 mm, as shown in FIG. 4.

Use of the pigment permitted the enamel to develop porosity when cured onto the glass substrate.

The resulting porous inorganic layer and glass substrate were fired at a curing temperature between 572° C. and 635° C. for between 5.5 minutes and 10 minutes. The glass substrates were then strengthened using an ion exchange process.

In Examples 1-15, the filling formulation was prepared by dissolving a porosity filling (e.g., methyl-silsesquioxane or methyl-phenyl-silsesquioxane resin) into an appropriate solvent such as pentyl propionate solvent to result in a 50 wt % solution. The filling formulation was sprayed onto the porous inorganic layer except in those of those samples that contain no porosity filling.

Crosslinking was carried out by heating the filled article to 150° C. for 30 minutes. Thereafter, excess filling formulation is cleaned from the surface on which such formulation is deposited and the areas on which filling formulation is not deposited are cleaned using isopropanol or ethanol.

The lightness value of black color (L*), corresponding to depth of color, was measured with a colorimeter Colori7 in a reflected mode, specular excluded, 10 mm aperture, illuminant D65—10° observer. These tests were done on the surface of the glass substrates opposite the decoration (i.e., the "glass side").

Figure 2:
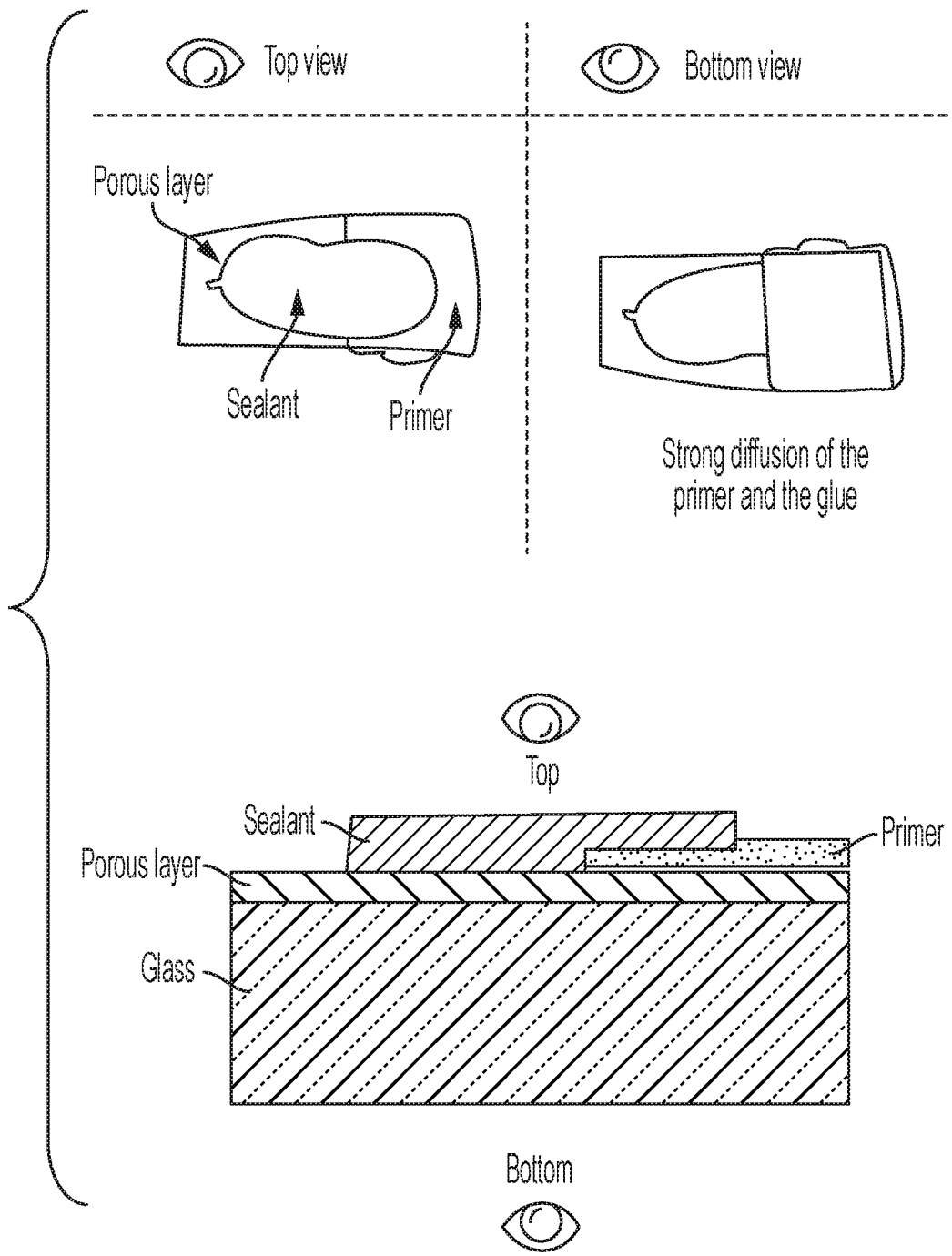
FIG. 2 provides two photographic views of the same sample to demonstrate the problem of primer diffusion and sealant glue diffusion on a porous inorganic layer.
Figure 3:
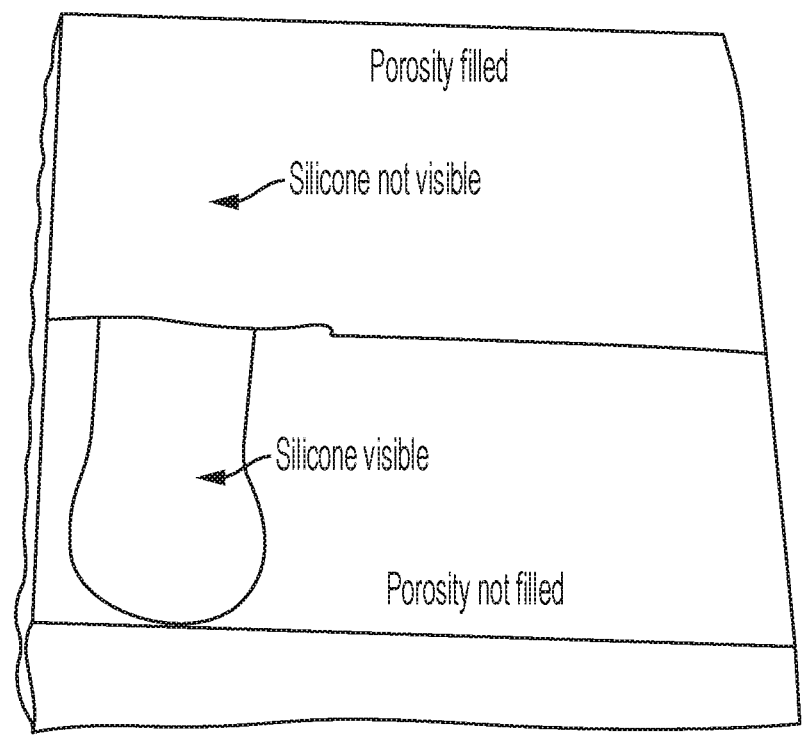
FIG. 3 provides a photograph comparing a filled porous inorganic layer which does not show silicone and an unfilled porous inorganic layer which suffers from silicone diffusion.

FIG. 3 provides a photograph comparing a filled porous inorganic layer which does not show silicone and an unfilled porous inorganic layer which suffers from silicone diffusion. Samples 5 and 6 in Table 1 reflect corresponding results. In Sample 6, silicone deposited on the back side of the substrate could not be observed from the front and the lightness value L* measurement showed an improvement of from 17 to 11. For context, FIG. 2 demonstrates the problem of primer and sealant diffusion.

Examples 16-21 are glass articles made using filling formulations that are solvent-free. To form Examples 16-21, an inorganic paste was prepared by mixing black enamel 14316 from Ferro with 15% of copper chromite black spinel pigment (B1G) from Shephard. The paste was deposited onto the surface of unstrengthened aluminosilicate glass substrates obtained from Corning Incorporated. The resulting porous inorganic layer and glass substrate were fired at a curing temperature of 625° C. for 7 minutes.

The filling formulations shown in Table 3 were sprayed onto the porous inorganic layers. These filling formulations were made by dissolving a silicone resin supplied by Wacker Chemie AG under the tradename Silres® H 44 in a silicone resin supplied by Shin-Etsu Chemical Co., Ltd. under the tradename X40-9296. The silicone resin supplied by Shin-Etsu Chemical Co., Ltd has a low viscosity (i.e., 20 mm²/s at 25° C.), and contains both methoxy function for reacting with the Silres® H 44 silicone resin, and methacrylic function. The methacrylic functions are polymerized using a thermal initiator, the benzoyl peroxide. The porous enamel is filled through a brushing method and a first curing step ("pre-curing") was performed as shown in Table 3. The partial polymerization of the resin through only the methacrylic group assists with water cleaning. A second curing step ("final curing") is then performed during the lamination step for condensation curing of the methoxy functions from the silicone compounds, as shown in Table 3. Table 3 also shows the amount of each silicone resin used in the filling formulations. Without being bound by theory, it is believed that these exemplary solutions have a higher filling rate because no solvents are used and no or very limited evaporation will occur during the curing step.

Table 3 shows the results obtained from Examples 16-21.

| Ex. | Filling formulation | 1st cure | Cleaning | 2$^{nd}$ cure* | L* measurement location side | L* |
|---|---|---|---|---|---|---|
| Comparative Example | No filling | NA | Water | NA | Glass side | 21.9 |
| Example 16 | Silres ® H 44 27.2% Shin Etsu X40-9296 | 90° C., 1 hour | Water | 150° C.- 30 mn | "Glass" side | 9 |
| Example 17 | | | | | | |
| Example 18 | 69.9% Benzyl peroxide (BPO) 2.9% | 100° C., 1 hour | Isopropanol (IPA) | None | "Glass" side | 10.45 |
| Example 19 | | 100° C., 30 minutes | Commercial windshield cleaning solution | None | "Glass" side | 9.4 |
| Example 20 | | | | 150° C.- 30 mn | "Glass" side | 11.05 |
| Example 21 (laminated with SLG) | Silres ® H 44 26.8% Shin Etsu X40-9296 70.3% BPO 2.9% | 90° C., 1 hour | Water | | S1 side | 6.05 |

*The Comparative Example and Examples 16-20 were subjected to a second curing step to mimic the lamination step performed on Example 21 (in which the decorated glass substrate was subjected to a heating step that cured the porous inorganic and filling formulation layers.

The lightness value of black color (L*), corresponding to depth of color, of Examples 16-21 was measured with a colorimeter Colori7 in a reflected mode, specular excluded, 10 mm aperture, illuminant D65—10° observer. As indicated in Table 3, the measurement was performed on the "glass side" on the glass articles of Examples 16-21 and the comparative example, which included no filling formulation. In Example 21, the glass article was laminated to a soda lime silicate glass (SLG) substrate having a thickness of 2.1 mm such that the inorganic porous layer is positioned on an outer surface of the glass article. When the laminate is used as automotive glazing, the inorganic porous layer could be positioned to face the interior of an automotive cabin or positioned outside the automotive cabin. The L* value of Example 21 was measured on the surface of the SLG glass substrate ("S1 side"). It is noted that strengthening of the glass substrates did not impact the L* values measured.

Example B

Four multilayer laminated glass articles were prepared according to Table 4.

A multilayer glass article or laminate was prepared having a first chemically-strengthened glass substrate, a second polyvinyl butyral (PVB) layer and a third soda-lime silicate glass (SLG) substrate, oriented according to the schematic in FIG. 1.

TABLE 4

| Example # | Substrate | Enamel | Content of added pigment (% wt) | Curing | Porosity filling | L* Measure on S1 side | L* Measure on S4 side | Scratch resistance |
|---|---|---|---|---|---|---|---|---|
| 22 | S4 | Ferro 14316 | 15% BIG | 625° C.- 5.5 min | Methyl-silsesquioxane | 11.4 | 24 | 12N |
| 23 | "windshield" type laminate | | 10% BIG | | | 9-9.5 | 26 | 20N |

TABLE 4-continued

| Example # | Substrate | Enamel | Content of added pigment (% wt) | Curing | Porosity filling | L* Measure on S1 side | L* Measure on S4 side | Scratch resistance |
|---|---|---|---|---|---|---|---|---|
| 24 | S3 | | 10% BIG | 575° C.- 10 min | No | 5.5 | 28 | |
| 25 | "windshield" type laminate | | | 625° C.- 5.5 min | Methyl-silsesquioxane | 5.5 | 9.8 | |

The porous inorganic layer was formed on unstrengthened aluminosilicate glass substrates according to the general method set forth in Example A. The glass substrates were then strengthened using the same process as Example A. The decorated chemically strengthened glass substrates was then laminated with the SLG substrate with an intervening PVB layer such that the porous inorganic layer is disposed on either the S4 surface of the laminate (i.e., the exterior surface of the chemically-strengthened glass layer) or the S3 surface (laminate-side surface of the chemically-strengthened glass layer) a.

Scratch resistance was measured using an Erichsen 318 sclerometer with a 0.75 mm Ø tip (Bosch test). Between 1 cm and 2 cm long scratches, at different strengths (in N), were made on the decoration deposited on surface S4 of Examples 22 and 23. Each measured value represents the maximum value for which no damage of the decoration is visible from surface S1.

Discussion

The effect of the content of pigment on L* values can be seen by comparison of several Examples. For example, comparing Example 3 with Example 5, Example 4 with Example 6, Example 8 with Example 9 or Example 22 with Example 23 show that reducing the content of pigment has improved the black coloration and depth of color (lower L* values). Examples 16-21 demonstrated even greater improvement of measured L* values.

The results also show that reduced pigment resulted in improved scratch resistance as shown in the comparison between Example 23 and Example 24, specifically, showing an improved scratch resistance from 12 to 20N.

The effect of the porosity filling is shown by comparing Example 1 with Example 2, Example 3 with Example 4, Example 5 with Example 6, Example 7 with Example 8, Example 10 with Example 11, Example 13 with Example 14, and Example 24 with Example 25 (S4 side). For each of these examples, filling the porosity with an organic resin significantly improved the black quality (lower L* value). Moreover, some resins provide better L* results as shown by comparing Example 11 with Example 12 or Example 14 with Example 15. Without intending to be limited by theory, one hypothesis which could explain this result with respect to resin is that a better matching between the refractive index of the polymerized resin and the inorganic layer. Thus, reducing the amount of scattered light, such as that responsible for "grey" coloration, can be thought to generate better black coloration and improved depth of color.

The present disclosure provides for the following embodiments, the numbering of which is not to be construed as designating levels of importance:

Embodiment 1 relates to a glass article comprising:
a chemically-strengthened glass substrate;
a porous inorganic layer adhered to at least a portion of the glass substrate and having a glass transition temperature of greater than 450° C., a glass softening temperature of less than 650° C. and a plurality of pores; and
a cross-linked organic resin within the pores of the porous inorganic layer.

Embodiment 2 relates to a glass article of Embodiment 1, wherein the glass substrate is a curved sheet having a concave surface and a convex surface, and the porous inorganic layer is adhered to the concave surface.

Embodiment 3 relates to a glass article of Embodiment 2, further comprising a sealant glue contacting at least a portion of the porous inorganic layer, the concave surface of the glass substrate, or both.

Embodiment 4 relates to a glass article of any one of Embodiments 1-3, wherein the glass substrate is a curved sheet having a concave surface and a convex surface, and the porous inorganic layer is adhered to the convex surface.

Embodiment 5 relates to a glass article of Embodiment 4, further comprising a polyvinyl butyral layer contacting at least a portion of the porous inorganic layer, the convex surface of the glass substrate, or both.

Embodiment 6 relates to a glass article of any one of Embodiments 1-5, wherein the porous inorganic layer comprises ceramic enamel and pigment.

Embodiment 7 relates to a glass article of any one of Embodiments 1-6, wherein the porous inorganic layer comprises a glass flux comprising oxides of Bi, B, Zn, Si, or any combination thereof, or from about 0 to about 10 mol % $Al_2O_3$; from about 0 to about 10 mol % CoO; from about 5 to about 25 mol % $Na_2O$; from about 0 to about 15 mol % $K_2O$; from about 0 to about 10 mol % $V_2O_5$; from about 0 to about 8 mol % $TiO_2$; from about 0 to about 15 mol % ZnO; from about 0 to about 10 mol % CaO; from about 20 to about 40 mol % $Fe_2O_3$; and at least about 50 mol % $P_2O_5$.

Embodiment 8 relates to a glass article of any one of Embodiments 1-7, wherein the porous inorganic layer has less than 1 mol % $Na_2O$; less than 10 mol % $Fe_2O_3$; or less than 25 mol % $P_2O_5$.

Embodiment 9 relates to a glass article of any one of Embodiments 1-8, wherein the cross-linked organic resin comprises one or more polysiloxane, polysilsesquioxane, polyacrylate, polystyrene, polyurethane, or polyamide.

Embodiment 10 relates to a glass article of any one of Embodiments 1-9, wherein the cross-linked organic resin comprises at least 5 wt % cross-linked monomer units and a glass transition temperature above 120° C.

Embodiment 11 relates to a glass article of any one of Embodiments 1-10, wherein the glass substrate has a coefficient of thermal expansion ranging between about 60× $10^{-7}$/° C. to about 110× $10^{-7}$/° C.

Embodiment 12 relates to a glass article of any one of Embodiments 1-11, wherein the porous inorganic layer and the glass substrate have coefficients of thermal expansion differing by 10× $10^{-7}$/° C. or less.

Embodiment 13 relates to a glass article of any one of Embodiments 1-12, wherein the glass substrate is an aluminosilicate glass or an aluminoborosilicate glass.

Embodiment 14 relates to a glass article of any one of Embodiments 1-13, wherein the glass substrate has a thickness of from about 0.3 mm to about 4.0 mm.

Embodiment 15 relates to a glass article of any one of Embodiments 1-14, wherein the glass substrate has a radius of curvature of less than 2000 mm and greater than 100 mm along a first axis.

Embodiment 16 relates to a glass article of any one of Embodiments 1-15, wherein the glass substrate comprises a flexural strength value defined by ring on ring testing (ROR)>300 MPa or >400 MPa.

Embodiment 17 relates to a glass article of any one of Embodiments 1-16, wherein the surfaces of the glass substrate are substantially free of the cross-linked organic resin.

Embodiment 18 relates to a glass article of any one of Embodiments 1-17, wherein the convex surface of the glass substrate comprises a second porous inorganic layer which contains unfilled or filled pores.

Embodiment 19 relates to a glass article of any one of Embodiments 1-18, wherein the porous inorganic layer is a decorative frit.

Embodiment 20 relates to a glass article of any one of Embodiments 1-19, wherein the porous inorganic layer is a ceramic automotive glass enamel.

Embodiment 21 relates to a glass article of any one of Embodiments 1-20, wherein the porous inorganic layer comprises a pigment.

Embodiment 22 relates to a glass article of any one of Embodiments 1-21, further comprising a urethane-based sealant glue, a silicone-based sealant glue, or both.

Embodiment 23 relates to a glass article of any one of Embodiments 1-22, for use as automotive glass.

Embodiment 24 relates to a glass article of any one of Embodiments 1-23 in the form of a windshield.

Embodiment 25 relates to a glass article of any one of Embodiments 1-24, wherein the difference in coefficient of thermal expansion values between the glass substrate and the porous inorganic layer is within $10 \times 10^{-7}/°$ C.

Embodiment 26 relates to a glass article of any one of Embodiments 1-25, wherein the porous inorganic layer has a coefficient of thermal expansion ranging between about $60 \times 10^{-7}/°$ C. to about $110 \times 10^{-7}/°$ C.

Embodiment 27 relates to a glass article of any one of Embodiments 1-26, wherein a compressive stress layer extends into the glass substrate and has a depth of greater than 30 μm.

Embodiment 28 relates to a glass article of any one of Embodiments 1-27, wherein the glass softening temperature is between about 500° C. to about 650° C.

Embodiment 29 relates to a glass article of any one of Embodiments 1-28, wherein the glass softening temperature Ts is between from about 525° C. to about 600° C.

Embodiment 30 relates to a glass article of any one of Embodiments 1-29, wherein the glass transition temperature is between about 450° C. to about 500° C.

Embodiment 31 relates to a multilayer automotive glass comprising the glass article of any one of Embodiments 1-30.

Embodiment 32 relates to a multilayer automotive glass comprising:
  a first glass substrate having a first major surface (S1) and a second major surface (S2);
  a second glass substrate having a third major surface (S3) and a fourth major surface (S4);
  a polyvinyl butyrate layer contacting the second major surface of the first glass substrate and the third major surface of the second glass substrate; and
  a porous inorganic layer adhered to at least a portion of one or more of the second major surface of the first glass substrate, the third major surface of the second glass substrate, or the fourth major surface of the second glass substrate;
  wherein the porous inorganic layer has a glass transition temperature of greater than 450° C., a glass softening temperature of less than 650° C. and a plurality of pores containing a cross-linked organic resin.

Embodiment 33 relates to the multilayer automotive glass of Embodiment 32, wherein the first glass substrate is a soda-lime glass substrate.

Embodiment 34 relates to the multilayer automotive glass of Embodiment 32, wherein the first glass substrate is a chemically-strengthened glass substrate.

Embodiment 35 relates to the multilayer automotive glass of any one of Embodiments 32-34, wherein the second glass substrate is a chemically-strengthened glass substrate.

Embodiment 36 relates to the multilayer automotive glass of any one of Embodiments 32-35, wherein the porous inorganic layer is adhered to at least a portion of the second major surface of the first glass substrate and the third major surface of the second glass substrate.

Embodiment 37 relates to the multilayer automotive glass of any one of Embodiments 32-36, wherein the porous inorganic layer is adhered to at least a portion of the second major surface of the first glass substrate and the fourth major surface of the second glass substrate.

Embodiment 38 relates to the multilayer automotive glass of any one of Embodiments 32-37, wherein the first glass substrate and the second glass substrate each have a concave surface and a convex surface.

Embodiment 39 relates to the multilayer automotive glass of any one of Embodiments 32-38, wherein a second porous inorganic layer is adhered to at least a portion of the third major surface of the second glass substrate and in contact with the polyvinyl butyrate layer.

Embodiment 40 relates to the multilayer automotive glass of any one of Embodiments 32-39, further comprising a sealant glue contacting at least a portion of the porous inorganic layer, the fourth major surface of the second glass substrate, or both.

Embodiment 41 relates to the multilayer automotive glass of Embodiment 40, wherein the sealant glue contacts the second major surface of the first glass substrate, or the third major surface of the second glass substrate, or both.

Embodiment 42 relates to the multilayer automotive glass of Embodiment 40, wherein the second major surface of the first glass substrate, or the third major surface of the second glass substrate, or both, are substantially free of sealant glue.

Embodiment 43 relates to the multilayer automotive glass of any one of Embodiments 32-42, wherein the porous inorganic layer comprises ceramic enamel and pigment.

Embodiment 44 relates to the multilayer automotive glass of any one of Embodiments 32-43, wherein the porous inorganic layer comprises a glass flux comprising oxides of Bi, B, Zn, Si, or any combination thereof, and the porous inorganic layer has less than 1 mol % $Na_2O$; less than 10 mol % $Fe_2O_3$; or less than 25 mol % $P_2O_5$.

Embodiment 45 relates to the multilayer automotive glass of any one of Embodiments 32-44, wherein the cross-linked organic resin comprises one or more polysiloxane, polysilsesquioxane, polyacrylate, polyvinyl, polystyrene, polyurethane, or polyamide.

Embodiment 46 relates to a method of preparing a glass article, comprising:
- depositing onto a glass substrate an inorganic mixture containing ceramic enamel and pigment to provide an inorganic layer;
- curing the glass substrate and the deposited inorganic layer at a temperature greater than the glass softening temperature of the inorganic layer to provide a porous inorganic layer;
- chemically strengthening the cured glass substrate and the porous inorganic layer thereon via ion exchange at a temperature below the glass transition temperature (Tg) of the porous inorganic layer;
- treating the chemically-strengthening glass substrate and porous inorganic layer with a filler formulation comprising a polymerizable cross-linking component; and
- curing the polymerizable cross-linking component to provide a cross-linked organic resin within pores of the porous inorganic layer to provide a filled-pore decorative layer.

Embodiment 47 relates to the method of Embodiment 46, comprising bending the chemically-strengthening glass substrate at about the same time as curing the deposited inorganic layer.

Embodiment 48 relates to a method of any one of Embodiments 46-49, wherein the filler formulation comprises an organic solvent.

Embodiment 49 relates to a method of any one of Embodiments 46-48, further comprising cleaning the surface of the filler-treated porous inorganic layer to remove components of the filler formulation from the surface of the inorganic layer or glass substrate.

Embodiment 50 relates to a method of Embodiment 49, wherein the surface is cleaned with acetone, isopropanol, ethanol, water, or a mixture thereof.

What is claimed is:

1. A glass article comprising:
   a chemically-strengthened glass substrate;
   a porous inorganic layer adhered to at least a portion of the glass substrate and having a glass transition temperature of greater than 450° C., a glass softening temperature of less than 650° C. and a plurality of pores; and
   a cross-linked organic resin within the pores of the porous inorganic layer.

2. The glass article of claim 1, wherein the glass substrate is a curved sheet having a concave surface and a convex surface, and the porous inorganic layer is adhered to the concave surface or the convex surface.

3. The glass article of claim 2, further comprising a sealant glue contacting at least a portion of the porous inorganic layer, the concave surface of the glass substrate, or both.

4. The glass article of claim 2, further comprising a polyvinyl butyral layer contacting at least a portion of the porous inorganic layer, the convex surface of the glass substrate, or both.

5. The glass article of claim 1, wherein the porous inorganic layer comprises ceramic enamel and pigment.

6. The glass article of claim 1, wherein the porous inorganic layer comprises a glass flux comprising oxides of Bi, B, Zn, Si, or any combination thereof.

7. The glass article of claim 1, wherein the porous inorganic layer has less than 1 mol % $Na_2O$, less than 10 mol % $Fe_2O_3$, or less than 25 mol % $P_2O_5$.

8. The glass article of claim 1, wherein the cross-linked organic resin comprises one or more polysiloxane, polysilsesquioxane, polyacrylate, polystyrene, polyurethane, or polyamide.

9. The glass article of claim 1, wherein the cross-linked organic resin comprises at least 5 wt % cross-linked monomer units and a glass transition temperature above 120° C.

10. A multilayer automotive glass comprising:
    a first glass substrate having a first major surface and a second major surface;
    a second glass substrate having a third major surface and a fourth major surface;
    a polyvinyl butyrate layer contacting the second major surface of the first glass substrate and the third major surface of the second glass substrate; and
    a porous inorganic layer adhered to at least a portion of the fourth major surface of the second glass substrate;
    wherein the second glass substrate is chemically-strengthened and the porous inorganic layer has a glass transition temperature of greater than 450° C., a glass softening temperature of less than 650° C. and a plurality of pores containing a cross-linked organic resin.

11. The multilayer automotive glass of claim 10, wherein the first glass substrate and the second glass substrate each have a concave surface and a convex surface.

12. The multilayer automotive glass of claim 10, wherein a second porous inorganic layer is adhered to at least a portion of the third major surface of the second glass substrate and in contact with the polyvinyl butyrate layer.

13. The multilayer automotive glass of claim 10, further comprising a sealant glue contacting at least a portion of the porous inorganic layer, the fourth major surface of the second glass substrate, or both.

14. The multilayer automotive glass of claim 10, wherein the porous inorganic layer comprises ceramic enamel and pigment.

15. The multilayer automotive glass of claim 10, wherein the porous inorganic layer comprises a glass flux comprising oxides of Bi, B, Zn, Si, or any combination thereof, and the porous inorganic layer has less than 1 mol % $Na_2O$, less than 10 mol % $Fe_2O_3$, or less than 25 mol % $P_2O_5$.

16. The multilayer automotive glass of claim 10, wherein the cross-linked organic resin comprises one or more polysiloxane, polysilsesquioxane, polyacrylate, polyvinyl, polystyrene, polyurethane, or polyamide.

* * * * *